(12) United States Patent
Taguchi et al.

(10) Patent No.: US 10,953,435 B2
(45) Date of Patent: Mar. 23, 2021

(54) METHOD FOR PRODUCING BUILDING MATERIAL

(71) Applicant: Nichiha Corporation, Nagoya (JP)

(72) Inventors: Hiroyuki Taguchi, Nagoya (JP); Miho Murase, Nagoya (JP)

(73) Assignee: NICHIHA CORPORATION, Nagoya (JP)

( * ) Notice: Subject to any disclaimer, the term of this patent is extended or adjusted under 35 U.S.C. 154(b) by 0 days.

(21) Appl. No.: 15/257,269

(22) Filed: Sep. 6, 2016

(65) Prior Publication Data

US 2017/0087592 A1 Mar. 30, 2017

(30) Foreign Application Priority Data

Sep. 30, 2015 (JP) .............................. JP2015-194155

(51) Int. Cl.
*C04B 41/52* (2006.01)
*B05D 3/00* (2006.01)
(Continued)

(52) U.S. Cl.
CPC ............. *B05D 7/548* (2013.01); *B05D 3/007* (2013.01); *C04B 41/009* (2013.01); *C04B 41/52* (2013.01);
(Continued)

(58) Field of Classification Search
CPC .................................................. E04F 13/148
See application file for complete search history.

(56) References Cited

U.S. PATENT DOCUMENTS 2,873,210 A * 2/1959 Barrett, Jr. ........... C09D 167/08
428/458
4,042,539 A * 8/1977 Fanning ............... C09D 133/12
524/40
(Continued)

FOREIGN PATENT DOCUMENTS

CN 103694862 A 4/2014
EP 3075720 A1 10/2016
(Continued)

OTHER PUBLICATIONS https://homeguides.sfgate.com/repair-uneven-cement-boards-33470.html, retrieved Feb. 7, 2019, Posted on Jun. 28, 2012 (Year: 2012).*
(Continued)

*Primary Examiner* — Francisco W Tschen
(74) *Attorney, Agent, or Firm* — Birch, Stewart, Kolasch & Birch, LLP

(57) ABSTRACT

A method for producing a building material includes a first step of applying an undercoat paint onto a surface of an inorganic base material, curing the undercoat paint, and polishing the undercoat paint; and a second step of applying an enamel paint onto the undercoat paint and curing the enamel paint. The undercoat paint contains an undercoat-forming material and a filler. The enamel paint contains an enamel-forming material and a pigment. The enamel-forming material is a solvent-based resin. A content of the filler in the undercoat paint is 40% to 70% by mass in terms of solid content. A content of the pigment in the enamel paint is 1% to 50% by mass in terms of solid content.

13 Claims, 3 Drawing Sheets

(51) Int. Cl.
| | |
|---|---|
| *B05D 7/00* | (2006.01) |
| *E04C 2/06* | (2006.01) |
| *C04B 41/00* | (2006.01) |
| *C04B 41/71* | (2006.01) |
| *E04F 13/14* | (2006.01) |

(52) U.S. Cl.
CPC .............. *C04B 41/71* (2013.01); *E04C 2/06* (2013.01); *E04F 13/148* (2013.01)

(56) References Cited

U.S. PATENT DOCUMENTS

| | | | | |
|---|---|---|---|---|
| 4,491,620 | A * | 1/1985 | Joiner, Jr. | G21K 4/00 250/483.1 |
| 4,668,588 | A * | 5/1987 | Kishima | C08J 7/047 427/393.5 |
| 5,114,514 | A * | 5/1992 | Landis | B29C 63/48 156/153 |
| 5,871,824 | A * | 2/1999 | Bates | C04B 41/009 427/340 |
| 2001/0043987 | A1 * | 11/2001 | Olson | B05D 3/10 427/189 |
| 2001/0049022 | A1 * | 12/2001 | Takeuchi | B32B 27/00 428/423.1 |
| 2002/0081437 | A1 * | 6/2002 | Dargontina | B44C 5/04 428/425.1 |
| 2004/0185263 | A1 * | 9/2004 | Sormani | C08G 18/4063 428/422.8 |
| 2004/0191529 | A1 * | 9/2004 | Gillie | B32B 27/32 428/424.2 |
| 2005/0031873 | A1 * | 2/2005 | Berschel | B05D 7/572 428/411.1 |
| 2009/0308001 | A1 * | 12/2009 | Wu | E04B 1/762 52/173.3 |
| 2012/0251787 | A1 * | 10/2012 | Mizuno | B44F 9/02 428/165 |
| 2014/0349028 | A1 * | 11/2014 | De Silva | C09D 133/06 427/517 |
| 2016/0289128 | A1 | 10/2016 | Murase et al. | |
| 2017/0056922 | A1 | 3/2017 | Taguchi et al. | |

FOREIGN PATENT DOCUMENTS

| | | | |
|---|---|---|---|
| EP | 3 135 654 | A1 | 3/2017 |
| JP | 1-246185 | A | 10/1989 |
| JP | 11-21185 | A | 1/1999 |
| JP | 2005-219000 | A | 8/2005 |
| JP | 2006-181492 | A | 7/2006 |
| JP | 2011-163069 | A | 8/2011 |

OTHER PUBLICATIONS https://www.finehomebuilding.com/forum/cedar-stained-cement-siding, retrieved Feb. 7, 2019, Posted on Sep. 12, 2005, p. 3 (Year: 2005).* https://www.bobvila.com/articles/30124-dream-it-do-it-how-to-paint-wood-furniture/, Retrieved Mar. 18, 2019, Published on Feb. 28, 2013, pp. 1-3 (Year: 2013).*

European Patent Office Communication and extended search report issued in the corresponding European Patent Application No. 16186276.8 dated Feb. 2, 2017.

European Patent Office Communication pursuant to Article 94(3) EPC issued in the corresponding European Patent Application No. 16 186 276.8 dated Apr. 16, 2019.

Japanese Notice of Reasons for Refusal (including an English translation thereof) issued in the corresponding Japanese Patent Application No. 2015-194155 dated Jul. 23, 2019.

Third Party Submission submitted in the corresponding Japanese Patent Application No. 2015-194155 dated Dec. 2, 2019.

Chinese Office Action (including an English translation thereof) issued in the corresponding Chinese Patent Application No. 2016010657327.5 dated Aug. 31, 2020.

* cited by examiner

METHOD FOR PRODUCING BUILDING MATERIAL

CROSS REFERENCES TO RELATED APPLICATIONS

This application is based on Japanese Patent Application No. 2015-194155 filed in the Japan Patent Office on Sep. 30, 2015, the entire contents of which are hereby incorporated by reference.

BACKGROUND OF THE INVENTION

1. Field of the Invention

The present invention relates to a building material such as a siding board.

2. Description of the Related Art

Inorganic materials such as fiber reinforced cement siding boards and autoclaved lightweight concrete (ALC) boards are used as building materials that form exterior walls and interior walls of buildings.

Recently, in building materials, requests for improving the design of external appearance have been increasing. To improve the design, an inorganic material is used as a base material, and a paint is applied onto a surface of the base material to form a coating. For example, Japanese Unexamined Patent Application Publication No. 2006-181492 discloses a method including applying a polyester paint onto a surface of a base material to form an undercoat layer, subsequently applying a polyester black enamel paint to form a middle coat layer, subsequently applying a polyester clear paint, performing curing and drying, and subsequently polishing the resulting coating of the polyester clear paint to form a mirror-finished surface.

According to the method disclosed in Japanese Unexamined Patent Application Publication No. 2006-181492, although the surface can be mirror-finished, it is necessary to polish the coating formed on the outermost surface. The polishing must be performed after the coating is cured, and thus this method takes time and labor. In order to polish a coating over a wide region to mirror finish, facilities and techniques are necessary. In addition, there is a concern that uneven polishing (generation of a spot pattern) may occur.

Furthermore, since inorganic materials such as fiber reinforced cement siding boards and ALC boards have fine irregularities on surfaces thereof, polishing is necessary. However, in actuality, when such inorganic materials are polished, uneven polishing (generation of a spot pattern) occurs, the appearance is poor, and it is desirable to conceal such poor appearance.

SUMMARY OF THE INVENTION

The present invention has been made in view of the problems described above. It is desirable to provide a method for producing a mirror-finished building material, in which a coating on the outermost surface is not polished and defects on a surface of an inorganic base material are concealed.

A method for producing a building material according to an aspect of the present invention includes a first step of applying an undercoat paint onto (a surface of) an inorganic base material, curing the undercoat paint, and polishing the undercoat paint; and a second step of applying an enamel paint onto the undercoat paint and curing the enamel paint, in which the undercoat paint contains an undercoat-forming material and a filler, the enamel paint contains an enamel-forming material and a pigment, the enamel-forming material is a solvent-based resin, a content of the filler in the undercoat paint is 40% to 70% by mass in terms of solid content, and a content of the pigment in the enamel paint is 1% to 50% by mass in terms of solid content.

According to the aspect of the present invention, it is possible to provide a mirror-finished building material which includes an inorganic base material having fine irregularities on a surface thereof and in which a coating on the outermost surface is not polished and defects on the surface of the inorganic base material are concealed.

DESCRIPTION OF THE PREFERRED EMBODIMENTS

Figure 1:
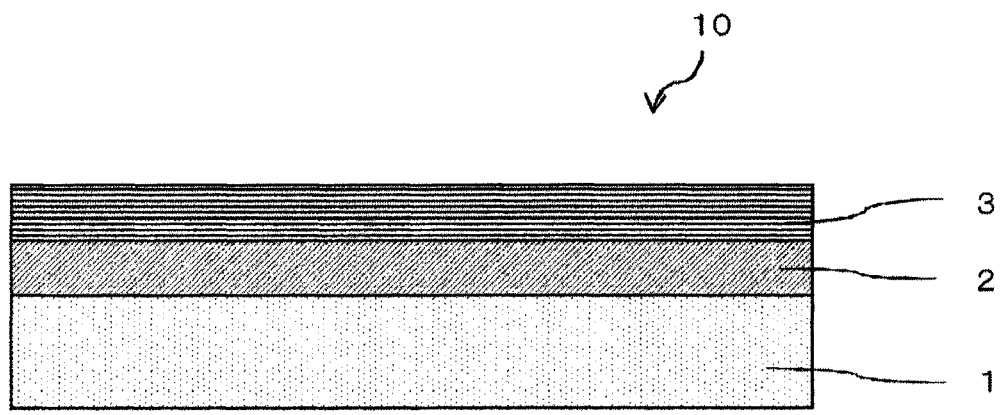
FIG. 1 is an enlarged sectional view of a part of a building material produced in Embodiment 1 of the present invention.

A production method according to an aspect of the present invention includes a first step of applying an undercoat paint onto (a surface of) an inorganic base material, curing the undercoat paint, and polishing the undercoat paint; and a second step of applying an enamel paint onto the undercoat paint and curing the enamel paint.

Examples of the inorganic base material include fiber-reinforced cement boards, wood cement boards, wood wool cement boards, slag plaster boards, pulp fiber reinforced cement boards, wood fiber reinforced cement calcium silicate boards, wood flake reinforced cement calcium silicate boards, fiber reinforced cement calcium silicate boards, and ALC boards.

A sealer coating formed of, for example, an epoxy resin, an acrylic resin, or a urethane resin may be formed on a surface of the inorganic base material.

Even after the surface of the inorganic base material is polished, fine irregularities are present on the surface. Therefore, a coating is formed so that the surface of the inorganic base material becomes a mirror surface. In the method for producing a building material according to the aspect, a coating formed of an undercoat paint is formed on the surface of an inorganic base material, and a coating formed of an enamel paint is formed on the surface of the coating formed of the undercoat paint.

The undercoat paint contains an undercoat-forming material and a filler. Examples of the undercoat-forming material include ultraviolet (UV)-curable resins, solvent-based urethane resins, and solvent-based acrylic resins. Use of a UV-curable resin or a solvent-based urethane resin as the undercoat-forming material is preferable because a coating having a large thickness and having a substantially smooth surface can be formed and polishing is easily performed. Examples of the filler in the undercoat paint include talc, calcium carbonate, silica (crystalline silica, fused silica, and amorphous silica), glass (glass flakes and powdered glass fibers), quartz (powders), aluminum (powders), and mica (powders). At least one of talc, calcium carbonate, and silica is preferably contained as the filler because the resulting coating is easily polished and is good in terms of concealing the inorganic base material.

The content of the filler in the undercoat paint is adjusted in the range of 40% by mass or more and 70% by mass or less in terms of solid content. A coating that is easily polished and that conceals the surface of the inorganic base material can be formed by specifying the content of the filler. The undercoat paint may optionally contain, for example, a photoinitiator, a viscosity improver, a defoamer, a pH adjuster, a solvent, and an antiseptic.

In the first step, the undercoat paint is applied onto (a surface of) the inorganic base material, cured, and polished to smoothen the surface of the inorganic base material. The polishing is not particularly limited. A typical polishing method such as polishing with sandpaper, buffing, or belt polishing may be used.

The enamel paint is used for mirror-finishing the surface of the resulting building material, and more reliably concealing the inorganic base material. The enamel paint contains an enamel-forming material and a pigment. The enamel-forming material is a solvent-based resin. Examples thereof include solvent-based fluororesins, solvent-based acrylic resins, and solvent-based urethane resins. Examples of the pigment include titanium oxide, carbon, red iron oxide, chrome yellow, iron oxide, ultramarine, phthalocyanine blue, cobalt, and chromium oxide. At least one of titanium oxide, carbon, iron oxide, and an organic pigment is preferably contained as the pigment because the resulting coating has a good coloring property and the inorganic base material is more reliably concealed. A coating that is smooth without polishing a surface thereof and that conceals the inorganic base material can be formed by applying an enamel paint which contains a solvent-based resin and whose pigment content is adjusted in the range of 1% by mass or more and 50% by mass or less in terms of solid content, and curing the enamel paint. The enamel paint may optionally contain, for example, a viscosity improver, a defoamer, a pH adjuster, an antiseptic, a filler, an ultraviolet absorber, a solvent, and a light stabilizer.

According to the method for producing a building material according to the aspect, it is possible to provide a mirror-finished building material in which a coating on the outermost surface is not polished and an inorganic base material is concealed.

Building materials according to embodiments of the present invention will be described with reference to the accompanying drawings.

Embodiment 1 of the Present Invention

FIG. 1 is an enlarged sectional view of a part of a building material produced in Embodiment 1 of the present invention.

A building material 10 illustrated in FIG. 1 has an overall structure including an inorganic base material 1, an undercoating 2 formed on a surface of the inorganic base material 1, and an enamel coating 3 formed on a surface of the undercoating 2.

Examples of the inorganic base material 1 used herein include fiber-reinforced cement boards, wood cement boards, wood wool cement boards, slag plaster boards, pulp fiber reinforced cement boards, wood fiber reinforced cement calcium silicate boards, wood flake reinforced cement calcium silicate boards, fiber reinforced cement calcium silicate boards, and ALC boards.

In a method for producing the building material 10, the surface of the inorganic base material 1 is polished to be smooth. The polishing is not particularly limited. A typical polishing method such as polishing with sandpaper, buffing, or belt polishing may be used. For example, the surface of the inorganic base material 1 may be polished with sandpaper while the roughness of the sandpaper is sequentially changed from #80 to #100.

An undercoat paint is then applied onto the surface of the inorganic base material 1, cured, and polished to form the undercoating 2 (first step). A paint containing an undercoat-forming material and a filler is used as the undercoat paint.

Examples of the undercoat-forming material include UV-curable resins, solvent-based urethane resins, and solvent-based acrylic resins. Examples of the UV-curable resins include resins containing, for example, an acrylic resin, an epoxy resin; or a urethane resin as a main component. Use of a UV-curable resin or a solvent-based urethane resin as the undercoat-forming material is preferable because a coating having a large thickness and having a substantially smooth surface can be easily formed and polishing is easily performed. When the undercoat-forming material is a UV-curable resin, the undercoat paint further contains a photoinitiator. The undercoat paint may optionally contain, for example, a viscosity improver, a defoamer, a pH adjuster, a solvent, and an antiseptic.

Examples of the filler include talc, calcium carbonate, silica (crystalline silica, fused silica, and amorphous silica), glass (glass flakes and powdered glass fibers), quartz (powders), aluminum (powders), and mica (powders). At least one of talc, calcium carbonate, and silica is preferably contained as the filler because the resulting coating is easily polished and is good in terms of concealing the inorganic base material. A coating that is easily polished and that conceals the inorganic base material can be formed by adjusting the content of the filler in the undercoat paint in the range of 40% by mass or more and 70% by mass or less in terms of solid content.

A typical coating device such as a spray, a flow coater, a natural coater, or a roll coater is used for applying the undercoat paint. Examples of the coating method include a method including applying an undercoat paint that contains a solvent-based urethane resin as an undercoat-forming material using a spray, and a method including applying an undercoat paint that contains a UV-curable resin as an undercoat-forming material using a roll coater.

The undercoat paint is cured by a typical method. For example, when the undercoat paint is an ultraviolet-curable paint, the undercoat paint is irradiated with ultraviolet light. When the undercoat paint is a solvent-based paint, the undercoat paint is dried with a dryer at 50° C. to 120° C. or dried at room temperature.

A typical polishing method such as polishing with sandpaper, buffing, or belt polishing may be used for the polishing. For example, the surface of the cured undercoating 2 may be polished with sandpaper while the roughness of the sandpaper is sequentially changed from #320 to #400.

An enamel paint is then applied onto a surface of the undercoating 2 and cured to form the enamel coating 3 (second step). A paint containing an enamel-forming material and a pigment is used as the enamel paint.

The enamel-forming material is a solvent-based resin. Examples thereof include solvent-based fluororesins, solvent-based acrylic resins, and solvent-based urethane resins.

Examples of the pigment include titanium oxide, carbon, red iron oxide, chrome yellow, iron oxide, ultramarine, phthalocyanine blue, cobalt, and chromium oxide. At least one of titanium oxide, carbon, iron oxide, and an organic pigment is preferably contained as the pigment because the resulting coating has a good coloring property and the surface of the inorganic base material is more reliably concealed. A coating that conceals the inorganic base material can be formed by adjusting the content of the pigment in the enamel paint in the range of 1% by mass or more and 50% by mass or less in terms of solid content. The enamel paint may optionally contain, for example, a viscosity improver, a defoamer, a pH adjuster, an antiseptic, a filler, an ultraviolet absorber, a solvent, and a light stabilizer.

A typical coating device such as a spray, a flow coater, a natural coater, or a roll coater may be used for applying the enamel paint.

The enamel paint is cured by drying with a dryer at 50° C. to 120° C.

The operations and advantages of the present embodiment will be described.

In producing the building material 10, the undercoat paint containing a filler in an amount of 40% to 70% by mass in terms of solid content is applied onto a surface of the inorganic base material 1 and cured. Accordingly, the resulting coating is easily polished and conceals the surface of the inorganic base material 1. By polishing the surface of the coating formed of the undercoat paint, the undercoating 2 that conceals the surface of the inorganic base material 1 and has a smooth surface is formed. The enamel paint that contains a solvent-based resin is applied onto the smooth surface of the undercoating 2 and cured, and thus the enamel coating 3 having a smooth surface can be formed even without polishing. Since the enamel coating 3 contains a pigment in an amount of 1% to 50% by mass in terms of solid content, the color of the pigment satisfactorily conceals the inorganic base material 1, and the surface of the building material 10 becomes a mirror-finished surface.

Embodiment 2 of the Present Invention

Figure 2:
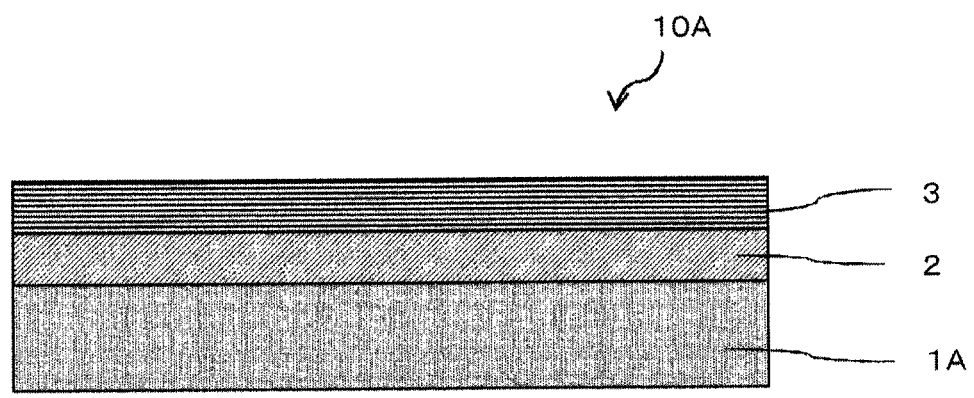
FIG. 2 is an enlarged sectional view of a part of a building material produced in Embodiment 2 of the present invention.

FIG. 2 is an enlarged sectional view of a part of a building material produced in Embodiment 2 of the present invention.

A building material 10A illustrated in FIG. 2 has an overall structure including an inorganic base material 1A, an undercoating 2 formed on a surface of the inorganic base material 1A, and an enamel coating 3 formed on a surface of the undercoating 2.

The inorganic base material 1A used herein is obtained by applying a sealer onto a surface of the inorganic base material 1. Examples of the sealer include, but are not particularly limited to, sealers formed of an epoxy resin, an acrylic resin, or a urethane resin. A typical coating device such as a spray, a flow coater, a natural coater, or a roll coater may be used for applying the sealer. The amount of sealer applied is also not particularly limited and is, for example, 3 g/square shaku (1 shaku=about 30.3 cm).

The undercoating 2 and the enamel coating 3 are the same as those of the building material 10.

According to the building material 10A, since the sealer is applied onto the inorganic base material 1A, the inorganic base material 1A has higher water resistance, and a building material having good adhesion between the inorganic base material 1A and the undercoating 2 is obtained.

The outline of a method for producing the building material 10A will be described. The method for producing the building material 10A is the same as the method for producing the building material 10 except that a sealer is applied onto the inorganic base material 1A. The method for producing the building material 10A differs from the method for producing the building material 10 in that an undercoat paint is applied onto a surface (sealer-applied surface) of the inorganic base material 1A, and other steps are the same as those in the method for producing the building material 10.

Embodiment 3 of the Present Invention

Figure 3:
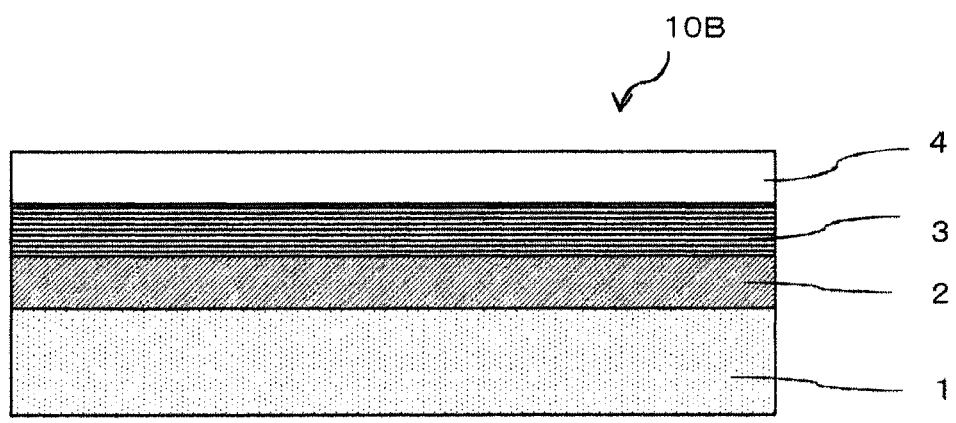
FIG. 3 is an enlarged sectional view of a part of a building material produced in Embodiment 3 of the present invention.

FIG. 3 is an enlarged sectional view of a part of a building material produced in Embodiment 3 of the present invention.

A building material 10B illustrated in FIG. 3 has an overall structure including an inorganic base material 1, an undercoating 2 formed on a surface of the inorganic base material 1, an enamel coating 3 formed on a surface of the undercoating 2, and a protective coating 4 formed on a surface of the enamel coating 3.

The protective coating 4 is formed of a protection-forming material. Examples of the protection-forming material include solvent-based fluororesins, solvent-based acrylic resins, solvent-based urethane resins, and solvent-based acrylic silicone resins.

According to the building material 10B, since the protective coating 4 is provided on the outermost surface, a building material having good weather resistance is obtained.

The outline of a method for producing the building material 10B will be described. The building material 10B is produced as in the building material 10 until the enamel coating 3 is formed. A protective paint is applied onto the surface of the enamel coating 3 and dried with a dryer at 50° C. to 120° C. A paint containing a protection-forming material is used as the protective paint. A typical coating device such as a spray, a flow coater, a natural coater, or a roll coater may be used for applying the protective paint.

Verification Experiments and Results Thereof

The inventors of the present invention conducted experiments for verifying various properties of building materials according to the present invention. For the experiments, test pieces of Samples 1 to 20 were prepared. Surfaces of the test pieces were observed. Furthermore, the specular gloss at 60°, adhesion, and concealing property of the inorganic base material of each of the test pieces were evaluated. Tables 1 and 2 show the compositions of undercoat paints, enamel paints, and protective paints. The test pieces were prepared as follows. A surface of the inorganic base material of each of the test pieces was polished with sandpaper (the roughness of the sandpaper was sequentially changed from #80 to #100). Regarding Samples 1 to 6, 10 to 16, and 18 to 20, an undercoat paint was then applied using a roll coater and cured by being irradiated with ultraviolet light. Regarding Samples 7 to 9 and 17, an undercoat paint was then applied using a spray and dried with a dryer at 50° C. to 120° C. Subsequently, the surface of the cured undercoat paint was polished with sandpaper (the roughness of the sandpaper was sequentially changed from #320 to #400). An enamel paint was then applied onto the surface of the polished undercoating using a flow coater and dried with a dryer at 50° C. to 120° C. Regarding Samples 7 to 13 and 16 to 19, a protective paint was applied onto the surface of the resulting enamel coating using a flow coater and dried with a dryer at 50° C. to 120° C. The surface of the inorganic base material used had a flat pattern (was flat). Evaluation results of the samples are also shown in Tables 1 and 2.

TABLE 1

| | | | Sample 1 | Sample 2 | Sample 3 | Sample 4 | Sample 5 | Sample 6 | Sample 7 | Sample 8 | Sample 9 | Sample 10 |
|---|---|---|---|---|---|---|---|---|---|---|---|---|
| Protective paint | Protection-forming material | Type | — | — | — | — | — | — | Solvent-based fluororesin | Solvent-based fluororesin | Solvent-based fluororesin | Solvent-based acrylic silicone resin |
| | | Tg | — | — | — | — | — | — | 50° C. | 50° C. | 50° C. | 50° C. |
| | Coating conditions | Solid content | — | — | — | — | — | — | 55% | 55% | 55% | 50% |
| | | Viscosity (NK-2) | — | — | — | — | — | — | 20 sec | 20 sec | 20 sec | 24 sec |
| | | Amount of coating | — | — | — | — | — | — | 110 g/m² | 110 g/m² | 110 g/m² | 130 g/m² |
| | | Board temperature before coating | — | — | — | — | — | — | 50° C. | 50° C. | 50° C. | 50° C. |
| Enamel paint | Enamel-forming material | Type | Solvent-based fluororesin | Solvent-based fluororesin | Solvent-based fluororesin | Solvent-based fluororesin | Solvent-based fluororesin | Solvent-based fluororesin | Solvent-based urethane resin | Solvent-based urethane resin | Solvent-based fluororesin | Solvent-based acrylic resin |
| | | Tg | 50° C. | 50° C. | 50° C. | 50° C. | 50° C. | 50° C. | 65° C. | 65° C. | 50° C. | 60° C. |
| | Pigment | Type | Carbon | Carbon | Carbon | Titanium oxide | Titanium oxide | Titanium oxide | Carbon | Carbon | Carbon | Iron oxide |
| | | Content (*1) | 1% | 20% | 40% | 1% | 20% | 50% | 1% | 20% | 40% | 1% |
| | Coating conditions | Solid content | 60% | 60% | 60% | 60% | 60% | 60% | 55% | 55% | 60% | 65% |
| | | Viscosity (NK-2) | 20 sec | 20 sec | 20 sec | 20 sec | 20 sec | 20 sec | 22 sec | 22 sec | 20 sec | 24 sec |
| | | Amount of coating | 110 g/m² | 110 g/m² | 110 g/m² | 110 g/m² | 110 g/m² | 110 g/m² | 80 g/m² | 80 g/m² | 80 g/m² | 130 g/m² |
| | | Board temperature before coating | 40° C. | 40° C. | 40° C. | 40° C. | 40° C. | 40° C. | 50° C. | 50° C. | 50° C. | 50° C. |
| Undercoat paint | Undercoat-forming material | Type | UV-curable acrylic resin | UV-curable acrylic resin | UV-curable acrylic resin | UV-curable acrylic resin | UV-curable acrylic resin | UV-curable acrylic resin | Solvent-based urethane resin | Solvent-based urethane resin | Solvent-based urethane resin | UV-curable acrylic resin |
| | | Tg | — | — | — | — | — | — | 65° C. | 65° C. | 65° C. | — |
| | Filler (*2) | Content (*1) | 40% | 40% | 40% | 55% | 55% | 55% | 70% | 70% | 70% | 50% |
| | Inorganic base material | | Wood cement board | Wood cement board | Wood cement board | Wood cement board having acrylic resin paint on surface thereof | Wood cement board having acrylic resin paint on surface thereof | Wood cement board having acrylic resin paint on surface thereof | Wood cement board having urethane resin paint on surface thereof | Wood cement board having urethane resin paint on surface thereof | Wood cement board having urethane resin paint on surface thereof | Wood cement board |
| Evaluations | Surface observation | | Good | Good | Good | Good | Good | Good | Good | Good | Good | Good |
| | Specular gloss at 60° | | 84 | 82 | 83 | 84 | 82 | 81 | 84 | 84 | 81 | 84 |
| | Adhesion | | Good | Good | Good | Good | Good | Good | Good | Good | Good | Good |
| | Concealing property of inorganic base material | | Good | Good | Good | Good | Good | Good | Good | Good | Good | Good |

(*1): In terms of solid content
(*2): Talc, calcium carbonate, and silica were used as filler.

TABLE 2

|  |  |  | Sample 11 | Sample 12 | Sample 13 | Sample 14 | Sample 15 | Sample 16 | Sample 17 | Sample 18 | Sample 19 | Sample 20 |
|---|---|---|---|---|---|---|---|---|---|---|---|---|
| Protective paint | Protection-forming material | Type | Solvent-based acrylic silicone resin | Solvent-based acrylic silicone resin | Solvent-based urethane resin | — | — | Solvent-based urethane resin | Solvent-based acrylic silicone resin | Solvent-based fluororesin | Solvent-based fluororesin | — |
|  |  | Tg | 50° C. | 50° C. | 65° C. | — | — | 65° C. | 50° C. | 50° C. | 50° C. | — |
|  | Coating conditions | Solid content | 50% | 50% | 58% | — | — | 58% | 50% | 55% | 55% | — |
|  |  | Viscosity (NK-2) | 24 sec | 24 sec | 22 sec | — | — | 22 sec | 24 sec | 20 sec | 20 sec | — |
|  |  | Amount of coating | 130 g/m² | 130 g/m² | 80 g/m² | — | — | 80 g/m² | 130 g/m² | 110 g/m² | 110 g/m² | — |
|  |  | Board temperature before coating | 50° C. | 50° C. | 50° C. | — | — | 50° C. | 50° C. | 50° C. | 50° C. | — |
| Enamel paint | Enamel-forming material | Type | Solvent-based acrylic resin | Solvent-based acrylic resin | Solvent-based acrylic resin | Solvent-based fluororesin | Solvent-based fluororesin | Solvent-based acrylic resin | Solvent-based urethane resin | Solvent-based urethane resin | Acrylic emulsion | Acrylic emulsion |
|  |  | Tg | 60° C. | 60° C. | 60° C. | 50° C. | 50° C. | 60° C. | 65° C. | 65° C. | 65° C. | 65° C. |
|  | Pigment | Type | Iron oxide | Iron oxide | Iron oxide | Carbon | Titanium oxide | Iron oxide | Iron oxide | Carbon/Calcium carbonate | Carbon/Calcium carbonate | Titanium oxide |
|  |  | Content (*1) | 20% | 50% | 20% | 60% | 60% | 60% | 60% | 0.4% | 20% | 20% |
|  | Coating conditions | Solid content | 65% | 65% | 65% | 60% | 60% | 65% | 65% | 55% | 50% | 50% |
|  |  | Viscosity (NK-2) | 24 sec | 24 sec | 24 sec | 20 sec | 20 sec | 24 sec | 24 sec | 22 sec | 20 sec | 20 sec |
|  |  | Amount of coating | 130 g/m² | 130 g/m² | 130 g/m² | 110 g/m² | 110 g/m² | 130 g/m² | 130 g/m² | 80 g/m2 | 80 g/m² | 80 g/m² |
|  |  | Board temperature before coating | 50° C. | 50° C. | 50° C. | 40° C. | 40° C. | 50° C. | 50° C. | 50° C. | 50° C. | 70° C. |
| Undercoat paint | Undercoat-forming material | Type | UV-curable acrylic resin | UV-curable acrylic resin | UV-curable acrylic resin | UV-curable acrylic resin | UV-curable acrylic resin | UV-curable acrylic resin | UV-curable acrylic resin | UV-curable acrylic resin | UV-curable acrylic resin | UV-curable acrylic resin |
|  |  | Tg |  |  |  |  |  |  |  |  |  |  |
|  | Filler (*2) | Content (*1) | 50% | 50% | 50% | 35% | 55% | 55% | 75% | 55% | 55% | 55% |
|  | Inorganic base material |  | Wood cement board | Wood cement board | Wood cement board | Wood cement board | Wood cement board | Wood cement board having acrylic resin paint on surface thereof | Wood cement board having urethane resin paint on surface thereof | Wood cement board | Wood cement board | Wood cement board having acrylic resin paint on surface thereof |
| Evaluations | Surface observation |  | Good | Good | Good | Poor | Poor | Poor | Poor | Poor | Poor | Poor |
|  | Specular gloss at 60° |  | 83 | 81 | 83 | 55 | 51 | 67 | 64 | 83 | 59 | 55 |
|  | Adhesion |  | Good | Good | Good | Good | Good | Good | Poor | Good | Poor | Poor |
|  | Concealing property of inorganic base material |  | Good | Good | Good | Good | Good | Good | Good | Poor | Good | Good |

(*1): In terms of solid content
(*2): Talc, calcium carbonate, and silica were used as filler.

The "surface observation" was performed by placing a test piece 2 m below a fluorescent lamp, and visually observing the reflection of the fluorescent lamp at the outermost surface of the test piece. In the tables, "Good" indicates that the reflected fluorescent lamp appears as a straight line, and "Poor" indicates that the reflected fluorescent lamp appears in a swaying manner or the reflected fluorescent lamp appears blurred.

The "specular gloss at 60°" shows the result of a specular gloss at 60° of the outermost surface of a test piece using a handy gloss meter (IG-320, manufactured by HORIBA, Ltd.) in accordance with JIS K 5600-4-7. A specular gloss at 60° of 80 or more is considered to be good.

The "adhesion" was evaluated by applying an adhesive tape onto the outermost surface of a test piece under pressure, and observing the state of a coating after separation of the adhesive tape. In the tables, "Good" indicates a coating separation of less than 10%, and "Poor" indicates a coating separation of 10% or more.

The "concealing property of inorganic base material" was evaluated by visually observing a test piece from the upper side. In the tables, "Good" indicates that the inorganic base material is not observed, and "Poor" indicates that the inorganic base material is observed.

Referring to Tables 1 and 2, Samples 1 to 13 are samples to which an undercoat paint containing, as an undercoat-forming material, any of a UV-curable acrylic resin and a solvent-based urethane resin, and a filler in an amount of 40% to 70% by mass in terms of solid content is applied, cured, and polished, and an enamel paint containing, as an enamel-forming material, any of a solvent-based fluororesin, a solvent-based urethane resin, and a solvent-based acrylic resin, and a pigment in an amount of 1% to 50% by mass in terms of solid content is applied and cured. In each of Samples 1 to 13, the result of the surface observation was "Good", the specular gloss at 60° was as high as 80 or more, a mirror-finished surface was obtained, and the results of the adhesion and the concealing property of the inorganic base material were also "Good". Thus, Samples 1 to 13 yielded good results.

In contrast, regarding each of Samples 14 and 17, in which an undercoat paint having a filler content out of the range of 40% to 70% by mass and an enamel paint having a pigment content out of the range of 1% to 50% by mass were used, the specular gloss at 60° was low, and the result of the surface observation was also "Poor". These results showed that a mirror-finished surface was not obtained.

Regarding each of Samples 15 and 16, in which an enamel paint having a pigment content of 60% by mass was used, the specular gloss at 60° was low, and the result of the surface observation was also "Poor". These results showed that a mirror-finished surface was not obtained.

Regarding Sample 18, in which an enamel paint having a low pigment content of 0.4% by mass was used, the surface observation was evaluated as "Poor", showing that a mirror-finished surface was not obtained, and the concealing property of the inorganic base material was also evaluated as "Poor".

Regarding each of Samples 19 and 20, in which an acrylic emulsion was used as the enamel-forming material, the specular gloss at 60° was low and the surface observation was evaluated as "Poor", showing that a mirror-finished surface was not obtained, and the adhesion was also poor.

Embodiments of the present invention have been described in detail with reference to the accompanying drawings. However, specific structures are not limited to these embodiments. Even when, for example, design changes are performed within a range that does not deviate from the gist of the present invention, such modifications are also included in the present invention.

As described above, according to the present invention, it is possible to provide a mirror-finished building material in which a coating on the outermost surface is not polished and an inorganic base material is concealed.

What is claimed is:

1. A method for producing a building material, comprising the steps of:
   polishing a flat surface of a fiber reinforced cement board by a first polisher, so that the fiber reinforced cement board has a polished flat surface;
   after the step of polishing, applying an undercoat paint onto the polished flat surface of the fiber reinforced cement board, curing the undercoat paint, and polishing the undercoat paint by a second polisher to form an undercoating having a polished flat surface, the second polisher having a less roughness than the first polisher; and then
   applying an enamel paint onto the polished flat surface of the undercoating and curing the enamel paint at 50° C. to 120° C. by a dryer to form an enamel coating having a flat surface and a specular gloss at 60° is 80 or greater,
   wherein the undercoat paint contains an undercoat-forming material and a filler,
   the enamel paint contains an enamel-forming material and a pigment,
   the undercoat-forming material is a solvent-based urethane resin having a glass transition temperature which is higher than that of the enamel-forming material, and
   the enamel-forming material is at least one of a solvent-based fluororesin, a solvent-based acrylic resin, and a solvent-based urethane resin,
   a content of the filler in the undercoat paint is 50% to 70% by mass in terms of solid content,
   a content of the pigment in the enamel paint is 40% to 50% by mass in terms of solid content, and
   the filler is at least one of talc, calcium carbonate, silica, glass, quartz, aluminum, and mica.

2. The method according to claim 1,
   the enamel-forming material is at least one of the solvent-based fluororesin and the solvent-based urethane resin.

3. The method according to claim 1,
   wherein the pigment is at least one of titanium oxide, carbon, iron oxide, and an organic pigment.

4. The method according to claim 1,
   wherein the first polisher is a first sandpaper; and
   the second polisher is a second sandpaper having a finer grit size than the first sandpaper.

5. The method according to claim 1,
   wherein the enamel paint is applied onto the polished flat surface of the undercoating in an amount of 80 g/m$^2$ to 130 g/m$^2$.

6. The method according to claim 1, further comprising a step of applying a protective paint onto the enamel coating to form a protective coating on the enamel coating,
   where the protective paint comprises at least one resin selected from the group consisting of a solvent-based fluororesin, a solvent-based acrylic resin, a solvent-based urethane resin, and a solvent-based acrylic silicone resin.

7. The method according to claim 6, further comprising a step of drying the protective paint at 50° C. to 120° C. by a dryer.

8. The method according to claim 6,
   wherein the protective coating, as an outermost surface of the building material, is not polished.

9. The method according to claim 1, further comprising a step of applying a sealer onto the polished flat surface of the fiber reinforced cement board before applying the undercoat paint,
   where the sealer comprises at least one resin selected from the group consisting of an epoxy resin, an acrylic resin, and a urethane resin.

10. The method according to claim 1,
    wherein the enamel coating, as an outermost surface of the building material, is not polished.

11. The method according to claim 1,
    wherein the undercoat-forming material of the undercoat paint is the solvent-based urethane resin, and the undercoat paint is cured at 50° C. to 120° C. by a dryer.

12. The method according to claim 1,
    wherein the enamel-forming material of the enamel paint is the solvent-based fluororesin.

13. The method according to claim 1,
    wherein the glass transition temperature of the solvent-based urethane resin is 15° C. higher than that of the enamel-forming material.

* * * * *